United States Patent
Morris et al.

(10) Patent No.: US 7,711,335 B2
(45) Date of Patent: May 4, 2010

(54) DIGITAL SATELLITE RECEIVER AND METHOD FOR SWITCHING AMONG MULTIPLE RECEIVER ANTENNAS USING DIVERSITY CIRCUITRY

(75) Inventors: Daniel G. Morris, Ovid, IN (US); Frank M. Hirschenberger, Oxford, MI (US); Pierre L. Wassom, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 807 days.

(21) Appl. No.: 11/445,361

(22) Filed: Jun. 1, 2006

(65) Prior Publication Data

US 2007/0281604 A1 Dec. 6, 2007

(51) Int. Cl.
H04B 7/08 (2006.01)

(52) U.S. Cl. .................... 455/133; 455/277.2

(58) Field of Classification Search ............. 455/3.02, 455/132, 133, 134, 135, 280, 293, 272, 277.1, 455/277.2; 375/347
See application file for complete search history.

(56) References Cited

U.S. PATENT DOCUMENTS 5,781,592 A * 7/1998 Masuda .................. 375/347

2002/0154059 A1 10/2002 Lindenmeier et al.
2005/0136906 A1 * 6/2005 Azuma .................. 455/418
2007/0206666 A1 * 9/2007 Hirschenberger ........... 375/211

FOREIGN PATENT DOCUMENTS

| EP | 0 999 661 | 5/2000 |
| WO | 00/28679 | 5/2000 |
| WO | 2005/055443 | 6/2005 |

OTHER PUBLICATIONS

"Delphi XM® Signal Repeater (SA10116-11B1)" by Delphi Product & Service Solutions, 1441 West Long Lake Road, Troy, MI 48098-5090, www.shopdelphi.com, 2 pages, © 2005 by Delphi Corporation.
European Search Report dated Jun. 17, 2008.

* cited by examiner

*Primary Examiner*—Nguyen Vo
(74) *Attorney, Agent, or Firm*—Jimmy L. Funke (57) ABSTRACT

A receiver for receiving and processing digital satellite radio signals includes multiple antenna modules for receiving digital satellite radio signals, multiple processing circuits for converting digital satellite radio signals to low-IF or 0-IF signals, diversity circuitry for selecting from among multiple low-IF or 0-IF signals, and additional processing circuitry for extracting audio and/or data from the selected signals. The system also includes automatic and manual switches for selecting from among multiple antennas, and for reducing power consumption of antenna and processing circuitry.

24 Claims, 5 Drawing Sheets

DIGITAL SATELLITE RECEIVER AND METHOD FOR SWITCHING AMONG MULTIPLE RECEIVER ANTENNAS USING DIVERSITY CIRCUITRY

TECHNICAL FIELD

The present invention is generally directed to RF receivers, and, more specifically, to a digital satellite RF receiver having multiple antennas, and method for improving switching among the multiple antennas in an ISM repeater environment.

BACKGROUND OF THE INVENTION

Satellite digital audio radio services (SDARS) have become increasingly popular, offering digital radio services covering large geographic areas, such as North America. These services receive uplinked programming, which, in turn, is rebroadcast directly to digital radios that subscribe to the service. Each subscriber to the service generally possesses a digital radio having a receiver and antenna for receiving the digital broadcast. Although many digital radios have been designed for use in vehicles, other digital radios are increasingly being designed for use in the home or office environment, and for personal portable or wearable usage, including in outdoor environments.

In SDARS systems, the digital satellite receivers are generally programmed to receive and decode digital satellite signals, which typically include many channels of digital audio. These signals are received directly from satellites, or from terrestrial repeaters that retransmit the digital satellite signals in order to provide improved coverage and availability. In addition to broadcasting encoded digital quality audio signals, the satellite service may also transmit data that may be used for various other applications. The broadcast signals may include advertising, information about warranty issues, information about the broadcast audio programs, and news, sports, and entertainment programming. Thus, the digital broadcasts may be employed for any of a number of satellite audio radio, satellite television, satellite Internet, and various other consumer services.

In order for a subscriber to receive digital satellite content via a digital radio, the receiver section of the digital radio typically must be able to receive the digital satellite signal from a satellite or terrestrial repeater. In most geographic areas, a clear uninterrupted view of the sky, or proximity to a terrestrial repeater, is generally required in order to properly receive the digital satellite signal. This can be problematic in situations in which a user wishes to use a portable digital satellite receiver while located inside a structure, such as a building or vehicle, or when the user is unable to locate the receiver such that the receiver can receive a digital satellite signal from a satellite or terrestrial repeater.

To provide improved access to digital satellite signals from satellites and/or terrestrial repeaters, some portable digital satellite receivers can be configured to employ multiple antennas. In some implementations, the receiver has an internal antenna, and is configured to allow an additional external antenna to be attached via an antenna jack. Typically, attaching an external antenna to an external antenna jack serves to disable the internal antenna, such that the tuner circuitry in the receiver only receives a signal from the external antenna when an external antenna is attached. If the external antenna is removed, the internal antenna is enabled, and the tuner circuitry in the receiver only receives a signal from the internal antenna. In other implementations, the digital satellite receiver may have two internal antennas built into the receiver. A user switch may then be employed to allow the user to select which of the two internal antennas will be the source of the signal supplied to the tuner circuitry. Although additional antennas (internal and/or external) can provide enhanced reception, these antennas still typically require a relatively clear, uninterrupted reception path between the antenna and the satellite or terrestrial repeater, and therefore do not completely solve the problem of poor reception in structures or vehicles.

One possible solution to this problem is the Delphi XM® Signal Repeater, commercially available from Delphi, which receives satellite signals in a satellite-band from an antenna in or on a structure, such as a house, converts the satellite-band signals to a frequency in the Industrial, Scientific, and Medical (ISM) frequency band, and wirelessly retransmits the converted digital satellite signals in the ISM-band to a repeater antenna module connected to an external antenna jack of a digital satellite receiver located in the structure. The repeater antenna module converts the ISM-band satellite signals back to satellite-band satellite signals, and provides the satellite-band satellite signals to the digital satellite receiver via the receiver antenna input. At this point, the digital satellite receiver processes the satellite-band satellite signals as it would any standard satellite-band satellite signal received directly from a satellite or terrestrial repeater. By using this system, a user can effectively extend the reach of an antenna located in or on a structure to other digital receivers in the structure.

Figure 1:
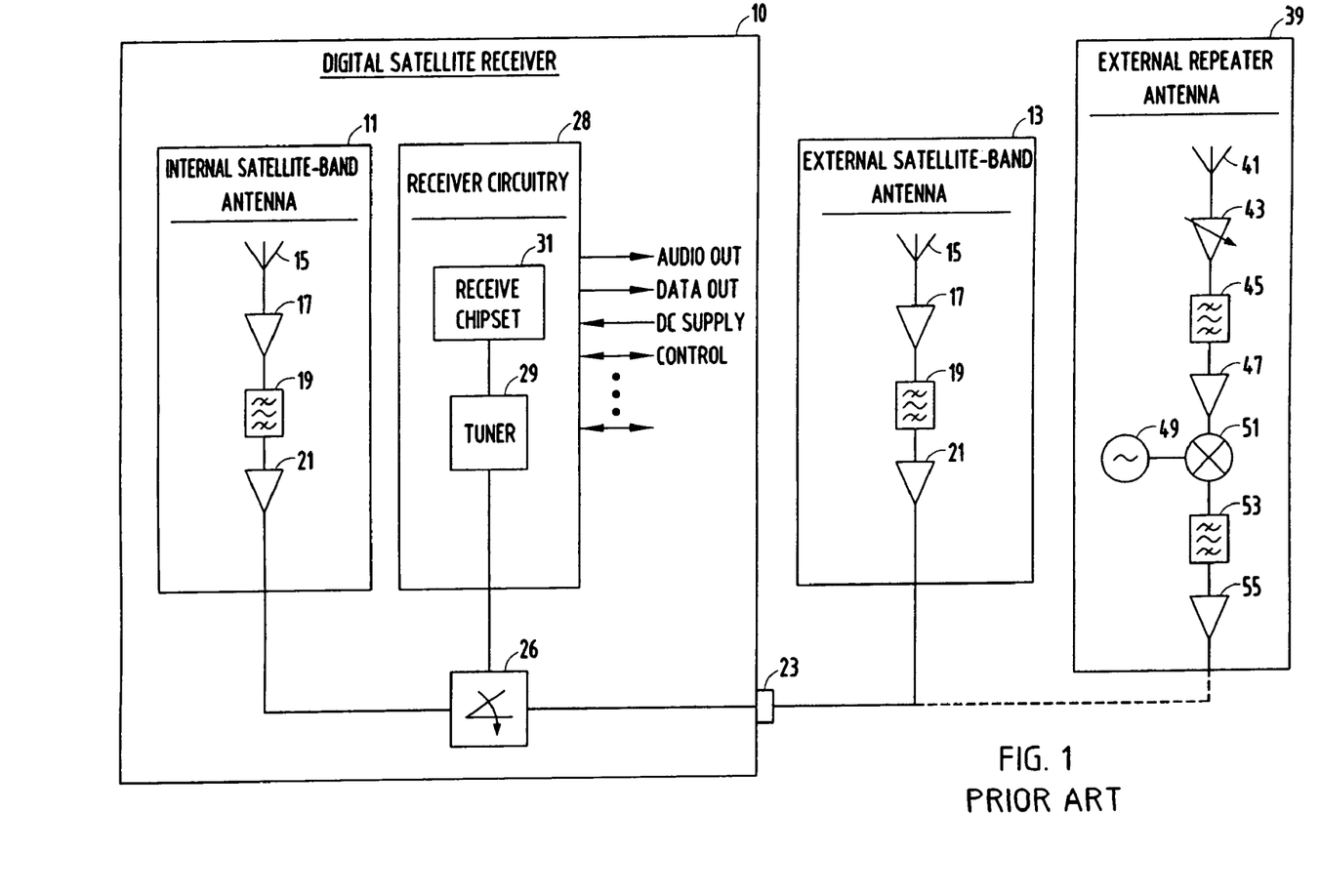
FIG. 1 is a schematic diagram of a conventional digital satellite radio receiver that is generally known.

FIG. 1 generally illustrates a conventional portable digital satellite receiver 10 employing multiple antennas and configured to switch among the multiple antennas. Portable digital satellite receiver 10 includes an internal digital satellite antenna 11 configured to receive a digital satellite signal in a digital satellite frequency band, such as 2.3 GHz. Antenna 11 provides an amplified digital satellite radio signal to an antenna switch 26. Portable receiver 10 is also shown having a connector 23 coupled to antenna switch 26. Connector 23 is configured to receive a connector from an external antenna and to provide an electrical connection between an external antenna and antenna switch 26.

One example of an antenna that can be removably coupled to connector 23 to provide an antenna signal to portable receiver 10 is an external SDARS antenna 13 configured to receive a digital satellite radio signal at approximately 2.3 GHz, and to provide an amplified version of that signal as an output. External SDARS antenna 13 operates in a manner similar to internal SDARS antenna 11. External repeater antenna 39 is another example of an antenna that can be removably coupled to connector 23. External repeater antenna 39 receives a signal in an Industrial, Scientific, and Medical (ISM) frequency band, converts the received signal in the ISM-band to a digital satellite signal in a digital satellite frequency band at approximately 2.3 GHz, and provides it as an output. As shown, either external SDARS antenna 13, or external repeater antenna 39, or no external antenna may be removably coupled to connector 23.

Antenna switch 26 provides an input signal to tuner 29 of receiver circuitry 28. The signal provided to tuner 29 by antenna switch 26 is determined based on whether or not an external antenna 13 or 39 is removably coupled to connector 23. If no external antenna is removably coupled to connector 23, antenna switch 26 provides the digital satellite signal received by internal SDARS antenna 11 to tuner 29. If an external antenna is coupled to connector 23, antenna switch 26 disables internal SDARS antenna 11, and provides a digital satellite radio signal provided by the external antenna coupled to tuner 29. Tuner 29 down-converts the received 2.3

GHz signal received from the antenna selected by antenna switch 26 to a baseband signal, also known as a ZIF, or zero-IF (zero intermediate frequency) signal. The ZIF or baseband signal output by tuner 30 is an analog signal containing I (in-phase) and Q (quadrature) signal information. The receive chipset 31 receives the analog ZIF or baseband signal from tuner 29, digitizes the analog signal and extracts audio and/or other data. The extracted audio and/or other data is then further processed by receiver 28 resulting in audio and/or data output.

Because tuner 29 is only configured to process a signal from one antenna selected by antenna switch 26 at any given time, a loss of data generally may occur when antenna switch 26 switches from an internal antenna 11 to an external antenna 13 or 39, or vice versa. A loss of signal can also occur if, for example, the external repeater antenna 39 is coupled to connector 23, and the user moves to a location without ISM repeater coverage. In addition, for portable receiver 10 to switch between an internal antenna 11 and an external antenna 13 or 39, a user is generally required to physically couple or uncouple an external antenna 13 or 39 to connector 23.

While the provision of multiple antennas, be they digital satellite antennas or repeater antennas, can provide enhanced performance for digital satellite receivers, physically attaching or removing external antennas, and user switching among multiple antennas using switches in conventional approaches, can be inconvenient. In addition, whether the switching is between internal antennas or between an internal antenna and an external antenna, the process of switching between antennas can cause the signal to the receiver tuner circuitry to be interrupted. This interruption, caused by delays due to switching, can lead to an interruption in the audio or data output by the receiver, and a sub-optimal user experience.

What is needed is a digital satellite receiver system that can conveniently switch among multiple antennas while minimizing signal processing delays associated with switching, reducing consequent degradation in audio and/or data output from the receiver.

SUMMARY OF THE INVENTION

For purposes of this invention, the term "intermediate frequency" (IF) includes either an intermediate frequency of 0 (also known as ZIF, zero-IF, 0-IF or baseband), or a low-intermediate frequency (also known as a low-IF). A low-IF is generally a frequency that is close to, but not equal to, zero-IF.

In accordance with one aspect of the present invention, a receiver for receiving and processing digital satellite radio signals with multiple antennas is provided. The receiver includes multiple antennas configured to receive digital satellite radio signals, and multiple processing circuits configured to convert the digital satellite radio signals into IF signals. The receiver further includes diversity circuitry coupled to the processing circuits, and configured to determine the quality of IF signals provided by the processing circuits, select which IF signals are to be further processed, and further process the selected IF signals to extract audio and/or data.

In accordance with another aspect of the present invention, a receiver for processing digital satellite radio signals provided by multiple antennas is provided. The receiver includes an internal antenna for receiving digital satellite radio signals in a first frequency band, a second internal repeater antenna module for receiving a digital satellite radio signal in a second frequency band and converting the digital satellite radio signal into a third frequency band, and multiple processing circuits configured to convert digital satellite radio signals in the first and third frequency bands into IF signals. According to one embodiment, the first and third frequency bands are the same. The receiver further includes diversity circuitry for receiving IF signals from the processing circuits, determining the quality of the IF signals, selecting which IF signals are to be further processed, and processing the selected signals to extract audio and/or data.

In accordance with yet another aspect of the present invention, a receiver for receiving and processing digital satellite radio signals provided by multiple internal antennas and an optional external antenna is provided. The receiver includes an internal antenna for receiving digital satellite radio signals in a first frequency band, an internal repeater antenna configured to receive digital satellite radio signals in a second frequency band and convert the digital satellite radio signals into a third frequency band, and an optional removably coupled external antenna. The system also includes a switch configured to select between the internal repeater antenna and the optional external antenna. The system further includes multiple processing circuits configured to receive digital satellite radio signals in the first and third frequency bands and convert them to an IF band, and diversity circuitry configured to select which of the IF signals are to be further processed, and further process the selected signals to extract audio and/or data.

In accordance with yet another aspect of the present invention, a method for improving reception in a digital satellite receiver by switching among multiple antenna sources is provided. The method includes the steps of receiving digital satellite radio signals in multiple antennas, providing the received signals to multiple processing circuits, and converting the signals into IF signals. The method further includes the steps of evaluating the IF signals in diversity processing circuitry to determine which signals are to be further processed, and further processing the selected signals to extract at least one of audio and data.

These and other features, advantages, and objects of the present invention will be further understood and appreciated by those skilled in the art by reference to the following specification, claims, and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 2:
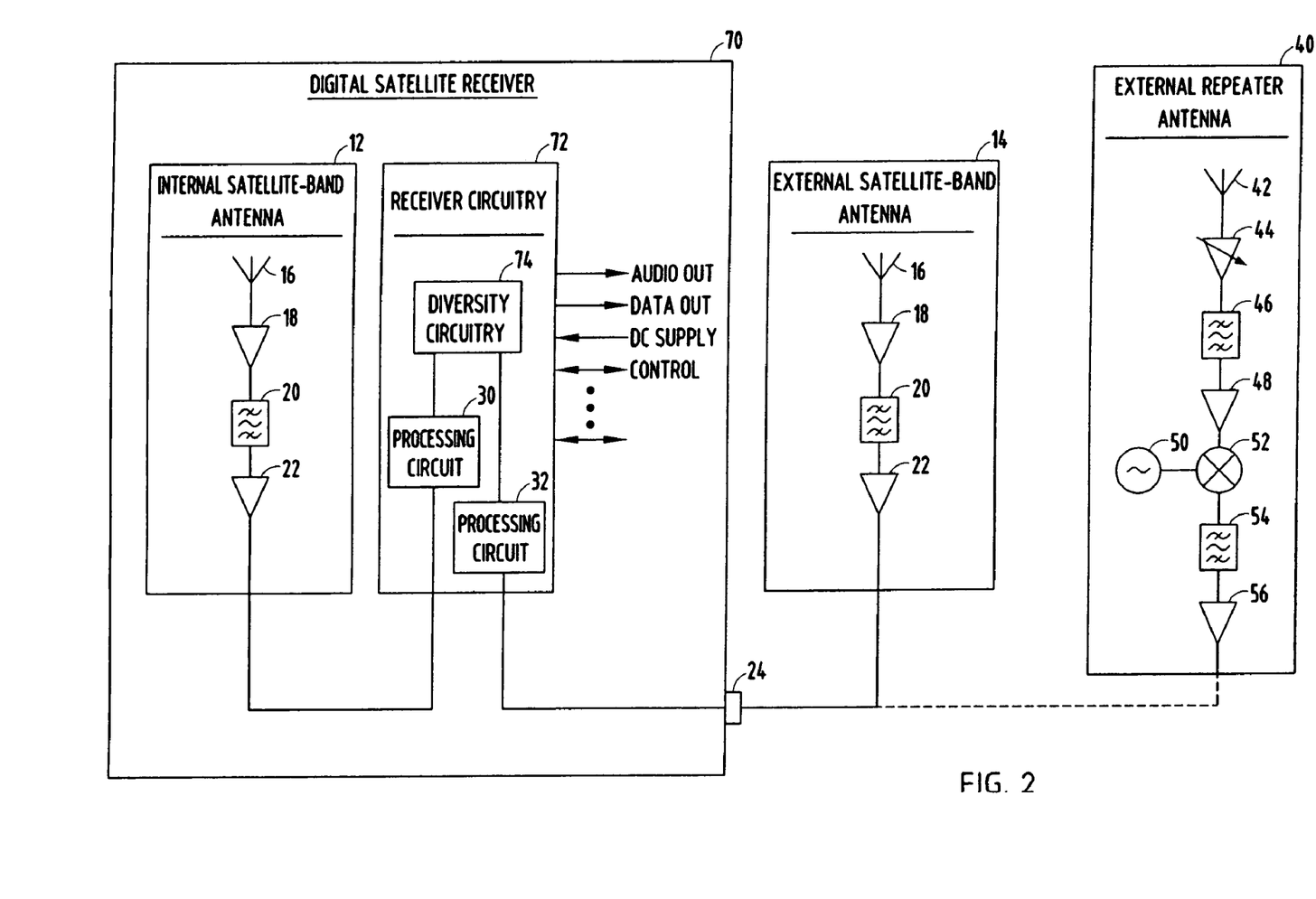
FIG. 2 is a schematic diagram of a digital satellite receiver configured to switch between an internal and external antenna module, according to a first embodiment of the present invention.

Referring now to FIG. 2, a digital satellite radio receiver 70 is generally illustrated, according to a first embodiment of the present invention. As shown, digital satellite radio receiver 70 is configured to receive and process satellite digital audio radio services (SDARS) digital satellite radio signals. Receiver 70 includes a first internal satellite-band antenna module 12 coupled to receiver circuitry 72. First antenna module 12 is configured to receive satellite-band SDARS digital satellite radio signals at approximately 2.3 GHz, according to one exemplary embodiment, and to further process the received signals before providing them to receiver circuitry 72.

First antenna module 12 includes an antenna element 16 configured to receive SDARS digital satellite radio signals, and a low-noise amplifier 18 for amplifying signals received by antenna element 16. First antenna module 12 is also shown having an optional bandpass filter 20 for filtering the amplified signal provided by low-noise amplifier 18, and a second (optional) low-noise amplifier 22 for amplifying the signal filtered by optional bandpass filter 20.

Receiver circuitry 72 includes a first processing circuit 30 coupled to first antenna module 12. First processing circuit 30 is configured to receive the satellite-band SDARS signals provided by first antenna module 12 at a frequency of approximately 2.3 GHz, and convert them into signals having an intermediate frequency (IF).

Receiver circuitry 72 is also shown having a second processing circuit 32 coupled to a coaxial connector 24. Second processing circuit 32 operates in a manner similar to first processing circuit 30 by receiving SDARS signals at approximately 2.3 GHz, and converting those signals into IF signals. Coaxial connector 24 is configured to permit an SDARS signal received by an external antenna that has been removably coupled to it to be provided to second processing circuit 32.

The external antennas 14 and 40 may be removably coupled to receiver 70 by means of coaxial connector 24. External antenna 14 is an external satellite-band antenna module configured to receive satellite-band SDARS signals at approximately 2.3 GHz, amplify and optionally further process those signals, and provide an SDARS signal output at approximately 2.3 GHz. Although the specific form of external satellite-band antenna module 14 may be different than the form of first satellite-band antenna module 12, the function provided by the satellite-band antenna modules 14 and 12 is essentially the same.

External ISM-band antenna module 40 is configured to receive SDARS digital satellite radio signals that have been transmitted by a repeater module in an ISM frequency band (e.g., 915 MHz or 5.8 GHz). External ISM-band antenna module 40 includes an antenna element 42 for receiving SDARS digital satellite radio signals in an ISM-band, a low-noise amplifier 44 with automatic gain control configured to vary the amplitude of the signal received by antenna element 42, and a bandpass filter 46 configured to filter the received SDARS signals. External ISM-band antenna module 40 also includes a second amplifier 48 for amplifying the filtered signal, and a frequency converter 52 configured to convert the SDARS signals from an ISM-band to a 2.3 GHz digital satellite frequency band based on a sine wave provided to frequency converter 52 by a locked oscillator 50. Finally, external ISM-band antenna module 40 includes a filter 54 for filtering the 2.3 GHz SDARS signals and an amplifier 56 for amplifying the 2.3 GHz SDARS signals before providing them as an output.

The receiver 70 may have no external antenna removably coupled to coaxial connector 24, or may have an external satellite-band antenna module 14 removably coupled to coaxial connector 24, or an external ISM-band antenna module 40 removably coupled to coaxial connector 24.

Receiver circuitry 72 is shown having diversity circuitry 74 coupled to first processing circuit 30 and second processing circuit 32. Diversity circuitry 74 receives and processes IF SDARS signals provided by first processing circuit 30, and IF SDARS signals provided by second processing circuit 32 (when an external antenna module 14 or 40 is removably coupled to coaxial connector 24). Diversity circuitry 74 compares the IF SDARS signals received from first processing circuit 30 and second processing circuit 32 to determine which IF SDARS signals have the highest quality. Diversity circuitry 74 then selects the highest quality signals for further processing. Because each processing circuit 30 and 32 is configured to process multiple signals and provide multiple signals to diversity circuitry 74, diversity circuitry 74 might select signals from the first processing circuit 30, the second processing circuit 32, or both first and second processing circuits 30 and 32 for further processing.

For example, if SDARS signals provided by first processing circuit 30 have a higher signal quality than SDARS signals provided by second processing circuit 32, or if no SDARS signals are available from second processing circuit 32, diversity circuitry 74 selects SDARS signals from first processing circuit 30 for further processing. If diversity circuitry 74 determines that SDARS signals from second processing circuit 32 are of higher quality than the SDARS signals provided by first processing circuit 30, diversity circuitry 74 switches to processing SDARS signals from second processing circuit 32. If, however, diversity circuitry 74 determines that a first signal has a higher quality from processing circuit 30 than from processing circuit 32, while a second signal has a higher quality from processing circuit 32 than from processing circuit 30, diversity circuitry 74 will select processing circuit 30 as the source for the first signal and processing circuit 32 as the source for the second signal. In this manner, diversity circuitry 74 continuously evaluates the signal quality of SDARS signals received from first and second processing circuits 30 and 32 and processes the best quality signals.

Signals selected and processed by diversity circuitry 74 are then provided to additional circuitry in receiver circuitry 72 where audio and/or data is extracted from the signals, processed, and provided as an output from receiver circuitry 72. It should be appreciated that the processing of signals received in first SDARS antenna module 12 by first processing circuitry 30 occurs in parallel with the processing of signals received in external SDARS antenna module 14 or external ISM-band antenna module 40 by second processing circuit 32. Because the processing of the various antenna signals occurs in parallel in processing circuits 30 and 32, data loss due to switching in diversity circuitry 74 between signals provided by first processing circuit 30 and second processing circuit 32 is reduced. In addition, because diversity circuitry 74 continually monitors the quality of the signals provided by first processing circuit 30 and second processing circuit 32 and automatically selects the highest quality signals for processing, the quality of the audio and/or data output by receiver 72 is enhanced beyond what would likely be possible with manual switching or selection.

In one example of operation of the receiver 70, a user employs receiver 70 in an outside environment with an unobstructed view of a satellite or terrestrial repeater providing SDARS digital satellite radio signals. The user attaches an external ISM-band antenna module 40 to receiver 70 by means of coaxial connector 24. Because the user is outside and has an unobstructed view of a satellite or terrestrial source for SDARS signals, first SDARS antenna module 12 receives relatively strong SDARS signals, and provides them to first processing circuit 30. Because the user is not within range of an SDARS repeater providing ISM-band SDARS signals, no signal is provided to second processing circuit 32 by ISM-band antenna module 40, and no IF signals are provided to diversity circuitry 74 by second processing circuit 32. First processing circuit 30 converts the 2.3 GHz SDARS signals received via first SDARS antenna module 12 into SDARS signals at an IF, and provides the IF signals to diversity circuitry 74. Diversity circuitry 74 compares the quality of the IF SDARS signals provided by first processing circuit 30 with the IF signals provided by second processing circuit 32 (which provides no IF signals because no external antenna is within adequate range), determines that the higher quality IF signals provided by first processing circuit 30 should be used for processing, and selects those signals for further processing in diversity circuitry 74 and receiver 72 to extract audio and/or data.

The user then moves into a location where strong ISM-band SDARS signals are available, and where a signal from a satellite or terrestrial repeater is weak or non-existent (e.g., inside a building). External ISM-band antenna module 40 converts the received ISM-band SDARS signals into SDARS signals at approximately 2.3 GHz, and provides the 2.3 GHz SDARS signals to second processing circuit 32. Second processing circuit 32 converts the signals to SDARS signals at an IF, and provides them to diversity circuitry 74. Diversity circuitry 74 compares the IF SDARS signals provided by first processing circuit 30 (which are relatively low-quality due to poor reception in antenna module 12) to those provided by second processing circuit 32, and determines that those provided by second processing circuit 32 from external ISM-band antenna module 40 have a higher quality than those provided by first processing circuit 30 from first SDARS antenna module 12. Based on this determination, diversity circuitry 74 switches to second processing circuit 32 as the source for the signals to be further processed. Diversity circuitry 74 continues to use second processing circuitry 32 as the source for signals to be processed until it determines that the signals provided by second processing circuit 32 are no longer the optimal signals. As noted above, in addition to selecting which SDARS signals are to be further processed, diversity circuitry 74 provides the selected SDARS signals to additional circuitry in receiver 72 for further processing and the extraction of audio and/or other data.

In another example of operation of the receiver 70, SDARS signals including at least three independent data streams are provided to the receiver 70. These data streams are referred to herein as satellite 1 (S1), satellite 2 (S2), and terrestrial 1 (T1). Antenna module 12 receives SDARS signals including S1, S2, and T1. The antenna module provides the SDARS signals, including S1, S2, and T1 to processing circuit 30. Processing circuit 30 converts the SDARS signals from a 2.3 GHz frequency to an IF frequency, and provides the SDARS signals to diversity circuitry 74. The IF signals provided to diversity circuitry 74 include S1, S2, and T1.

At the same time, processing circuit 32 receives SDARS signals, including S1, S2, and T1, from external antennas 14 or 40, converts the signals to an IF, and provides the signals, including S1, S2, and T1, to diversity circuitry 74. When diversity circuitry 74 evaluates the SDARS signals provided by processing circuits 30 and 32, it evaluates the signal quality of each of the S1, S2, and T1 signals, and selects which of tuners 30 or 32 will be the source for the S1, S2, and T1 signals that will be further processed by receiver 72. For example, if diversity circuitry 74 determines that the S1 signal provided by processing circuit 30 is of a higher quality than the S1 signal provided by processing circuit 32, diversity circuitry 74 will select the S1 signal provided by processing circuit 30 for further processing. At the same time, if diversity circuitry 74 determines that the S2 signal provided by processing circuit 32 is of a higher quality than the S2 signal provided by processing circuit 30, diversity circuitry 74 will select the S2 signal provided by processing circuit 32 for further processing in receiver 72. Finally, if diversity circuitry 74 determines that the T1 signal provided by processing circuit 32 is of higher quality than the T1 signal provided by processing circuit 30, diversity circuitry 74 will select the T1 signal provided by processing circuit 32 for further processing in receiver 72. The overall effect of receiver 72 having diversity circuitry 74 and multiple processing circuits 30 and 32 is a receiver 72 that is able to dynamically select the optimal SDARS S1, S2, and T1 signals from among multiple processing circuits for further processing.

It should be appreciated that in an alternative embodiment, digital satellite radio signals having more than three signals S1, S2, and T1 can be employed in the receiver. In another alternative embodiment, digital satellite receiver 70 includes a housing (not shown) in which first antenna module 12 and receiver circuitry 72 are housed.

Figure 3:
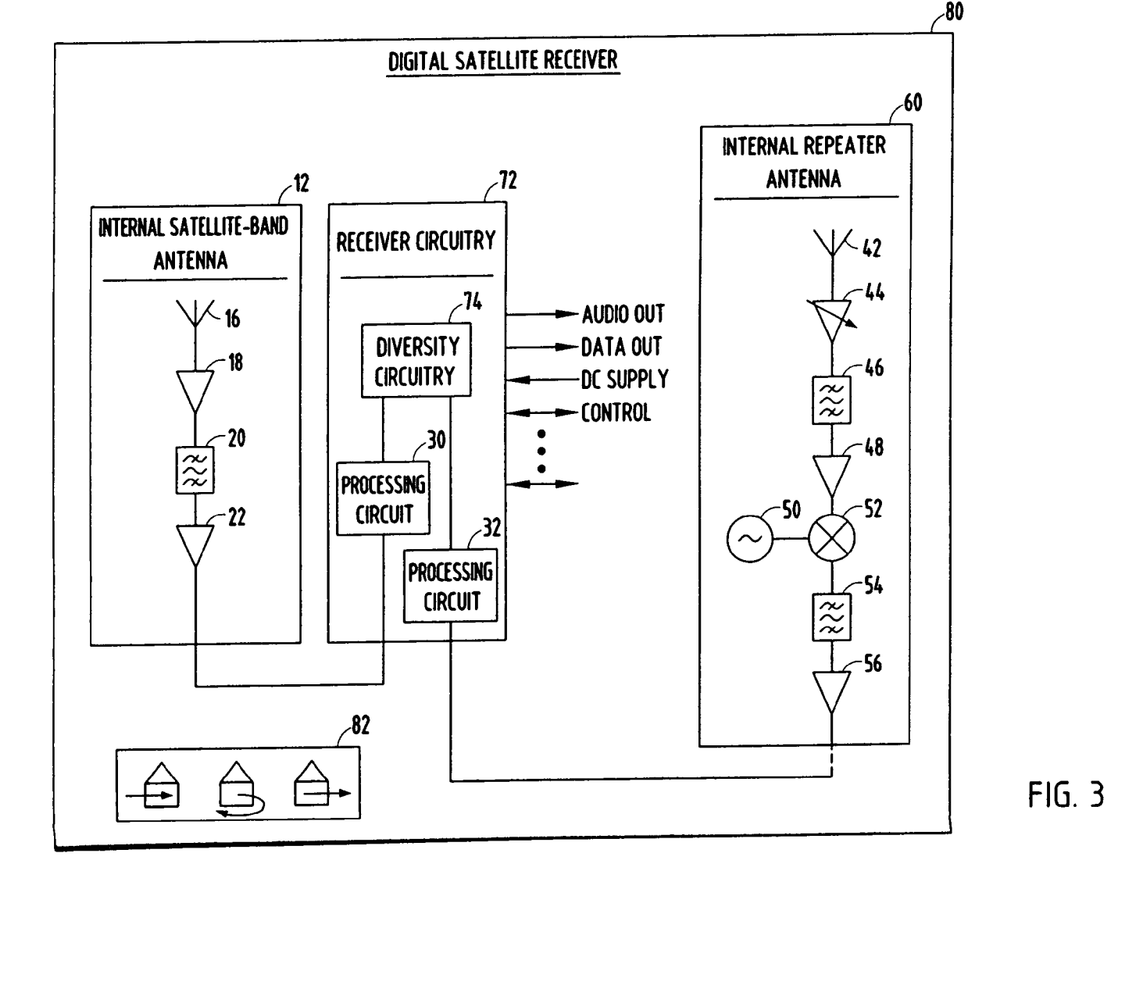
FIG. 3 is a schematic diagram of a digital satellite receiver configured to switch between multiple internal antenna modules, according to a second embodiment of the present invention.

Referring to FIG. 3, a portable digital satellite receiver 80 for receiving and processing digital satellite radio signals is provided, according to a second embodiment of the present invention. Receiver 80 is shown having receiver circuitry 72, which includes diversity circuitry 74 coupled to a first processing circuit 30 and a second processing circuit 32. First processing circuit 30 is coupled to an internal satellite-band SDARS antenna module 12. Second processing circuit 32 is coupled to an internal ISM-band antenna module 60. Receiver 80 differs from the receiver 70 of the first embodiment in that rather than having a coaxial connector 24 for removably coupling either of an external SDARS antenna module or an external ISM-band antenna module, receiver 80 has an internal ISM-band antenna module 60 that is coupled to second processing circuit 32. In addition, receiver 80 is shown having an optional user switch 82, further described below.

It should be appreciated that although the form of internal ISM-band antenna module 60 of the second embodiment may be different than the form of the external ISM-band antenna module 40 of the first embodiment, the functionality of internal ISM-band antenna module 60 is essentially the same as that of external ISM-band antenna module 40 of the first embodiment.

With the exception of functionality related to optional user switch 82, and the lack of removably coupled antennas coupled to receiver 80 via a coaxial connector, the overall function of first satellite-band SDARS antenna module 12, receiver 72, and internal ISM-band antenna module 60 is essentially the same as that described in the first embodiment. First satellite-band SDARS antenna module 12 receives SDARS digital satellite radio signals at approximately 2.3 GHz, and provides an amplified version of those signals at approximately 2.3 GHz to first processing circuit 30. Internal ISM-band antenna module 60 receives SDARS digital satellite radio signals in an ISM-band (e.g., 915 MHz or 5.8 GHz), converts the SDARS signals to an SDARS signal in a satellite-band at approximately 2.3 GHz, and provides the signals to second processing circuit 32. First and second processing circuits 30 and 32 convert the SDARS signals at approximately 2.3 GHz to IF signals, and provide the IF signals to diversity circuitry 74. Diversity circuitry 74 monitors the IF signals from first and second processing circuits 30 and 32 to determine which SDARS IF signals have the highest quality, and selects the highest quality SDARS IF signals for additional processing in receiver 72. Receiver 72 further processes the selected signals to extract audio and/or other data.

Receiver 80 is also shown having an optional user switch 82 configured to allow a user to select between at least three modes. User switch 82 is coupled to devices in receiver 80, including internal satellite-band SDARS antenna module 12, internal ISM-band antenna module 60, and first and second processing circuits 30 and 32. User switch 82 is configured to control the power delivered to these and other devices to which it is connected based on which of three modes has been selected by a user.

In a first mode, herein referred to as the "home mode," user switch 82 is configured to reduce the power consumed by first processing circuit 30 and internal satellite-band SDARS antenna module 12. The user is likely to select the home mode when the portable device is located inside a home or building where a high-quality satellite SDARS signal is less likely to be available, obviating the need to use internal satellite-band SDARS antenna module 12 and first processing circuit 30. In an alternative embodiment, user switch 82 is additionally configured in "home mode" to reduce the power consumed by diversity circuitry 74 and cause the signal provided by processing circuit 32 to bypass diversity circuitry 74 and be provided directly to additional processing circuitry in receiver 72 for the extraction of audio and/or data.

In a second mode, herein referred to as the "sat mode," user switch 82 is configured to reduce the power consumed by second processing circuit 32 and internal ISM-band antenna module 60. The user is likely to select this mode when the portable receiver 80 is out of range of a high-quality ISM-band SDARS signal, obviating the need to use internal ISM-band antenna module 60 and second processing circuit 32. In an alternative embodiment, user switch 82 is additionally configured in "sat mode" to reduce the power consumed by diversity circuitry 74 and cause the signal provided by processing circuit 30 to bypass diversity circuitry 74 and be provided directly to additional processing circuitry in receiver 72 for the extraction of audio and/or data.

In a third mode, herein referred to as the "both mode," user switch 82 does not reduce the power consumed by devices to which it is connected. The user is likely to select this mode when both satellite-band SDARS and ISM-band SDARS signals might be available. When user switch 82 is set to both modes, the receiver 80 operates as described above. In other words, both antenna modules 12 and 60 and first and second processing circuits 30 and 32 are active, and diversity circuitry 74 acts to select the optimal signals provided by first and second processing circuits 30 and 32 for processing. By employing user switch 82, users are able to optimize receiver power consumption based on the availability of satellite-band and ISM-band signals. It should be appreciated that user switch 82 can be a physical switch element located in receiver 80, or can be implemented in software.

In one alternative embodiment, digital satellite receiver 80 includes a housing (not shown) in which first antenna module 12 and receiver circuitry 72 are housed.

Figure 4:
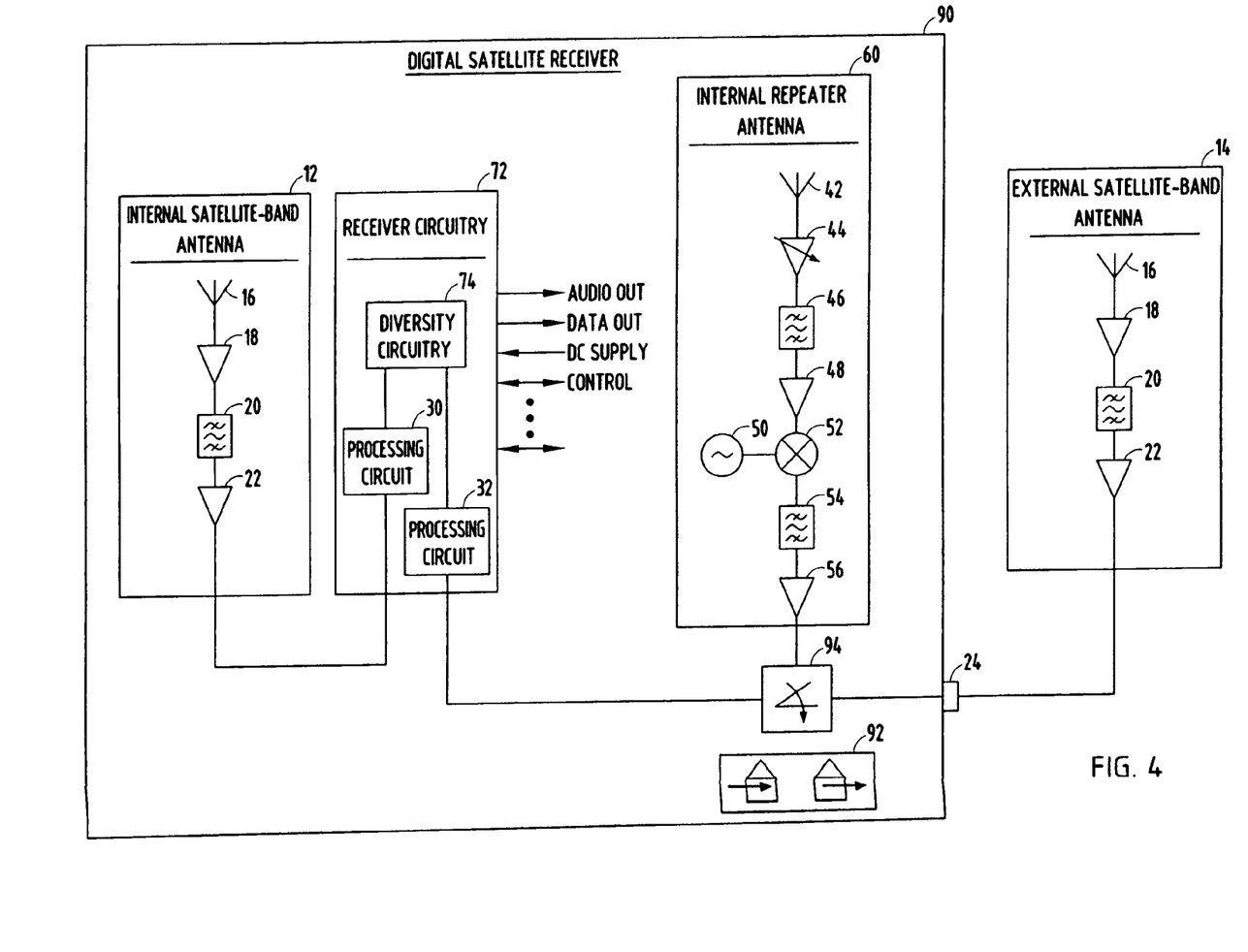
FIG. 4 is a schematic diagram of a digital satellite receiver configured to switch between both multiple internal antenna modules and an external antenna module, according to a third embodiment of the present invention.

Referring to FIG. 4, a portable digital satellite receiver 90 for receiving and processing digital satellite radio signals is generally illustrated, according to a third embodiment of the present invention. Receiver 90 is shown having an internal satellite-band SDARS antenna module 12 coupled to a first processing circuit 30 of receiver circuitry 72. The operation of internal satellite-band SDARS antenna module 12, first processing circuit 30, and diversity circuitry 74 is the same as that described in the first embodiment of the present invention.

Receiver 90 also includes an internal ISM-band antenna module 60. The operation of the internal ISM-band antenna module 60 is the same as described for internal ISM-band antenna module 60 in the second embodiment of the present invention. Internal ISM-band antenna module 60 is coupled to an antenna switch 94.

Receiver 90 further includes an optional external satellite-band SDARS antenna module 14 removably coupled to a coaxial connector 24. Coaxial connector 24 is electrically coupled to antenna switch 94, and operates to electrically connect external satellite-band SDARS antenna module 14 to antenna switch 94. Antenna switch 94 is also shown coupled to second processing circuit 32. Antenna switch 94 is configured to switch (or select) between a signal provided by internal ISM-band antenna module 60 and external satellite-band SDARS antenna module 14, and provide the selected antenna signal to second processing circuit 32. Antenna switch 94 is configured to sense a change in an electrical parameter when an external satellite-band SDARS antenna module 14 is removably coupled to coaxial connector 24. If antenna switch 94 determines that an external satellite-band SDARS antenna module 14 has been removably coupled to coaxial connector 24, antenna switch 94 disables internal ISM-band antenna module 60, and provides the signal received by external satellite-band SDARS antenna module 14 to second processing circuit 32. If antenna switch 94 does not detect that an external satellite-band SDARS antenna module 14 is removably coupled to coaxial connector 24, antenna switch 94 enables internal ISM-band antenna module 60, and provides the signal received by internal ISM-band antenna module 60 to second processing circuit 32.

Second processing circuit 32 operates in a manner similar to that described in the first and second embodiments of the present invention. Second processing circuit 32 receives SDARS digital satellite signals at approximately 2.3 GHz, according to the exemplary embodiment, converts the SDARS signals to an IF, and provides the IF SDARS signals to diversity circuitry 74. As described in the other embodiments, diversity circuitry 74 monitors the IF signals provided by first and second processing circuits 30 and 32, selects the SDARS signals having the highest quality for further processing, and processes the selected signals to extract audio and/or other data.

Although antenna switch 94 is configured to automatically switch between internal ISM-band antenna module 60 and external satellite-band SDARS antenna module 14 based on whether an external satellite-band SDARS antenna module 14 is removably coupled to coaxial connector 24, it should be appreciated that a user switch 92 could be substituted for antenna switch 94. As shown, user switch 92 permits a user to select between one of two states. In a first state, referred to herein as the "home state," antenna switch 92 selects internal ISM-band antenna module 60 as the source for the SDARS signals to be provided to second processing circuit 32, and reduces the power provided to an external satellite-band SDARS antenna module 14 if one is removably coupled to coaxial connector 24. In a second mode, referred to herein as the "sat mode," user switch 92 selects an external satellite-band SDARS antenna module 14 that is removably coupled to coaxial connector 24 as the source for the SDARS signal to be provided to second processing circuit 32, and reduces the power provided to internal ISM-band antenna module 60.

In an alternative embodiment, digital satellite receiver 90 includes a housing (not shown) in which first antenna module 12 and receiver circuitry 72 are housed.

Although the above-described embodiments disclose the signals received by satellite-band antenna modules 12 and 14 as being SDARS signals at approximately 2.3 GHz, and the signals output by antenna modules 12 and 14 as being SDARS signals at approximately 2.3 GHz, it should be appreciated that antenna modules 12 and 14 could be configured to receive digital satellite radio signals other than SDARS signals in digital satellite frequency bands other than 2.3 GHz, and output those digital satellite radio signals to first and second processing circuits 30 and 32 at digital satellite frequency bands other than 2.3 GHz.

It should also be appreciated that although the above-described embodiments disclose ISM-band antenna modules 40 and 60 receiving SDARS signals in an ISM-band, converting the SDARS signals in an ISM-band to SDARS signals at approximately 2.3 GHz, and providing the SDARS signals at approximately 2.3 GHz to second processing circuit 32, internal ISM-band antenna modules 40 and 60 could be configured to receive digital satellite radio signals other than SDARS signals in an ISM-band, convert the digital satellite radio signals to a digital satellite frequency band other than 2.3 GHz, and provide the digital satellite radio signals at a digital satellite frequency band other than 2.3 GHz to second processing circuit 32.

It should also be appreciated that for each of the above-described embodiments, first and second processing circuits 30 and 32 could be configured to receive digital satellite radio signals other than SDARS signals at digital satellite frequency bands other than 2.3 GHz, and convert the digital satellite radio signals into IF signals for processing by diversity circuitry 74.

Finally, it should be appreciated that for each of the above-described embodiments, diversity circuitry 74 could be configured to receive IF digital satellite radio signals other than SDARS signals, select the highest quality signals for further processing, and further process the selected signals to extract audio and/or data.

Figure 5:
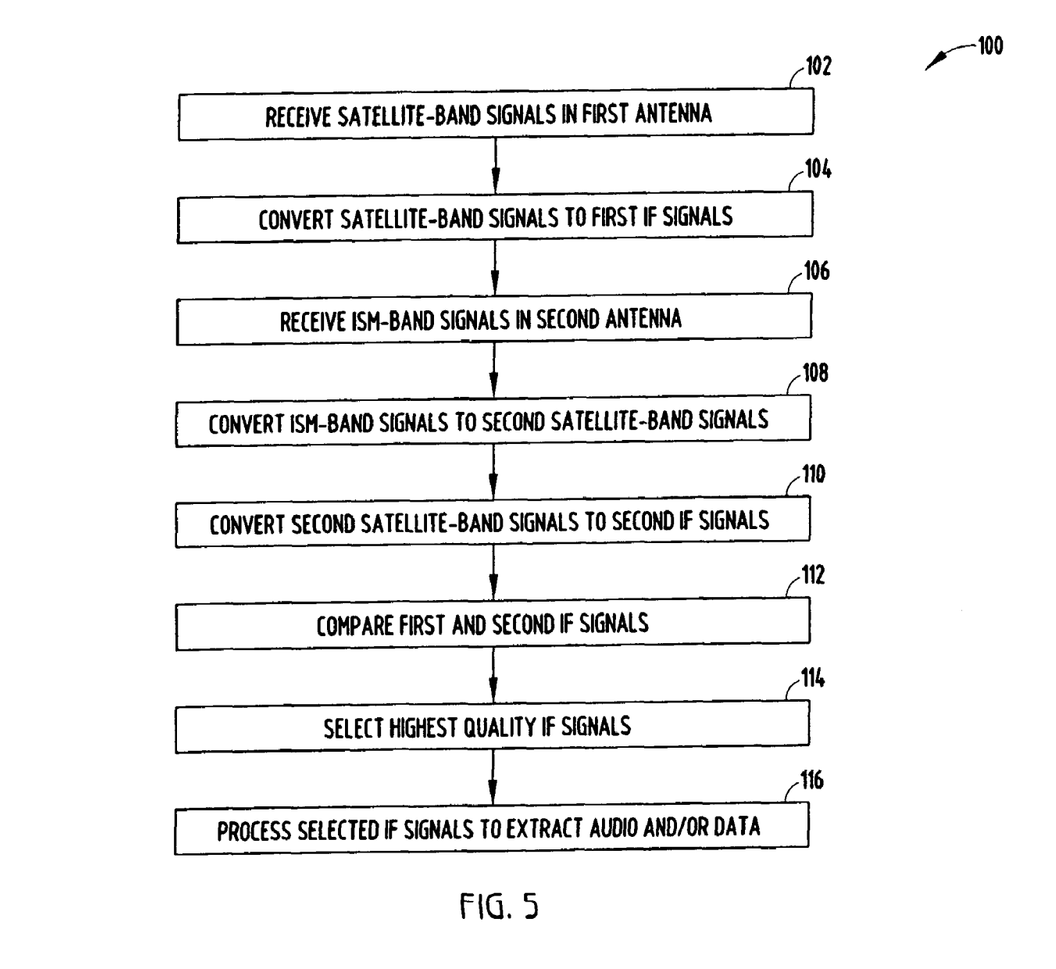
FIG. 5 is a flow diagram illustrating a method for improving reception in a digital satellite receiver by switching among multiple antenna sources, according to one embodiment of the present invention.

Referring to FIG. 5, a method 100 for receiving and processing digital satellite radio signals in a receiver having multiple antennas is provided, according to one embodiment of the present invention. In a first step 102 of the method, digital satellite radio signals in a satellite-band are received in a first antenna. Next, in step 104, the digital satellite radio signals are converted to IF signals. In step 106, digital satellite radio signals in an ISM-band are received in a second antenna. In step 108, the ISM-band signals are converted to satellite-band signals. Next, in step 110, the satellite-band signals converted in step 108 are converted to IF signals. In step 112, the IF signals originating from the first antenna are compared to the IF signals originating from the second antenna. In step 114, the IF signals having the highest quality are selected. Finally, in step 116, the selected IF signals are further processed to extract audio and/or data. According to one embodiment, the reception and conversion of signals in the first antenna (steps 102-104) occurs in parallel with the reception and conversion of signals in the second antenna (steps 106-110). In yet another embodiment, the reception and conversion of signals in the second antenna (steps 106-110) occurs prior to the reception and conversion of signals in the first antenna (steps 102-104).

Although references to an ISM frequency band in the various disclosed embodiments of the present invention recite 5.8 GHz as an example of an ISM frequency, references to an ISM frequency band are meant to include all frequencies currently considered to be ISM frequencies and frequencies later added to the ISM frequencies.

Although 2.3 GHz is recited as a frequency falling within a satellite-band or digital satellite frequency band, references to a satellite-band or a digital satellite frequency or frequency band are intended to include frequencies and frequency bands suitable for the reception and transmission of digital satellite radio signals.

The invention, as described, advantageously provides for a digital satellite receiver that is capable of utilizing multiple antennas to provide for enhanced satellite reception, while minimizing degradation in audio or data output caused by antenna signal switching.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A receiver for receiving and processing digital satellite radio signals, comprising:
   a first antenna configured to receive digital satellite radio signals in a first frequency band;
   a first processing circuit coupled to said first antenna for receiving digital satellite radio signals in the first frequency band from said first antenna and converting said digital satellite radio signals into first IF signals;
   a second antenna configured to receive digital satellite radio signals in a second frequency band and output digital satellite radio signals in a third frequency band;
   a second processing circuit coupled to said second antenna for receiving the digital satellite radio signals in the third frequency band from said second antenna and converting the digital satellite radio signals in the third frequency band into second IF signals;
   decoder circuitry for extracting at least one of audio and data;
   diversity signal processing circuitry coupled to the decoder circuitry and to said first processing circuit and said second processing circuit, wherein said diversity signal processing circuitry receives the first and second IF signals from said first and second processing circuits, selects at least one of the first and second IF signals for processing, and provides the selected IF signals to the decoder circuitry for processing to extract at least one of audio and data; and
   a switch configured to control power consumption of each of said first and second processing circuits based on the state of said switch, said switch having a plurality of states, wherein the power consumption of said first processing circuit is reduced relative to the power consumption of said second processing circuit in a first state of said switch, and the power consumption of said second processing circuit is reduced relative to the power consumption of said first processing circuit in a second state of said switch.

2. The receiver of claim 1, wherein said first frequency band is a digital satellite frequency band.

3. The receiver of claim 2, further comprising a receiver housing, wherein said first antenna, and at least one of said first processing circuit, second processing circuit, decoder circuitry, and diversity signal processing circuitry are located within said housing.

4. The receiver of claim 3, wherein said second frequency band is an industrial, scientific and medical (ISM) frequency band.

5. The receiver of claim 4, wherein said second antenna is located within said housing.

6. The receiver of claim 5, further comprising an antenna switch coupled to said second processing circuit, said second antenna, and a third antenna located external to said housing and configured to receive digital satellite radio signals in a fourth frequency band, wherein said antenna switch is configured to evaluate the quality of signals provided by said second and third antennas to determine which of the signals has a higher quality, and provide the signal having higher quality to said second processing circuit.

7. The receiver of claim 4, wherein said second antenna is located external to said housing.

8. The receiver of claim 3, wherein said second antenna is located external to said housing.

9. The receiver of claim 8, further comprising a connector mechanism coupled to the second antenna and the second processing circuit, and wherein said second antenna is removably coupled to said second processing circuit by said connector mechanism.

10. The receiver of claim 3, wherein said second processing circuit is configured to be turned off when no digital satellite radio signal in a third frequency band is provided by said second antenna.

11. The receiver of claim 3, wherein said second antenna is located within said housing.

12. The receiver of claim 1, wherein the switch comprises a user selectable switch, and the power of said first and second processing circuits is not reduced in a third state of said switch.

13. The receiver of claim 1, wherein the first and third frequency bands are approximately the same.

14. A method for receiving data in a digital satellite receiver by switching among multiple antenna sources, comprising the steps of:
receiving digital satellite radio signals in a first frequency band via a first antenna;
providing the received digital satellite signals in the first frequency band to a first processing circuit;
converting the received digital satellite signals in the first processing circuit into first IF signals;
providing the first IF signals to diversity processing circuitry;
receiving digital satellite radio signals in a second frequency band via a second antenna;
converting the digital satellite radio signals in the second frequency band into digital satellite radio signals in a third frequency band;
providing the digital satellite radio signals in the third frequency band to a second processing circuit;
converting the received digital satellite radio signals in the third frequency band into second IF signals in the second processing circuit;
providing the second IF signals to the diversity processing circuitry;
evaluating the received first and second IF signals in the diversity processing circuitry to determine which of the received first and second IF signals has a higher signal quality:
providing at least one of the first and second IF signals having a higher signal quality to audio processing circuitry, wherein the audio processing circuitry further processes the provided at least one of the first and second IF signals to extract at least one of audio and data; and
controlling the power Consumption of each of the first and second processing circuits based on the state of a switch, said switch having a plurality of states, wherein the power consumption of said first processing circuit is reduced relative to the power consumption of said second processing circuit in a first state of said switch, and the power consumption of said second processing circuit is reduced relative to the power consumption of said first processing circuit in a second state of said switch.

15. The method of claim 14, wherein the first frequency band is a digital satellite frequency band.

16. The method of claim 14, wherein the second frequency band is an industrial, scientific and medical (ISM) frequency band.

17. The method of claim 14, wherein the third frequency band is a digital satellite frequency band.

18. The method of claim 14, further including the step of reducing the power provided to the second processing circuit when no digital satellite radio signals in a third frequency band are provided to the second processing circuit.

19. The method of claim 14, wherein the second antenna is removably coupled to the second processing circuit via a connector mechanism.

20. The method of claim 14, wherein the power consumption is altered based on a user selectable switch, and the power of said first and second processing circuits is not reduced in a third state of said switch.

21. The method of claim 14, further including the steps of receiving a digital satellite radio signal in a digital satellite radio frequency band in a third antenna removably coupled to the digital satellite receiver, comparing the signal quality of the signal received from the third antenna to the signal quality of the signal received from the second antenna, and providing the signal having a higher signal quality to the second processing circuit.

22. A receiver for receiving and processing digital satellite radio signals, comprising:
a receiver housing for containing receiver circuitry;
a first antenna located within said receiver housing and configured to receive digital satellite radio signals in a satellite-band;
a first processing circuit located within said receiver housing and coupled to said first antenna, said first processing circuit being configured to receive digital satellite radio signals in a satellite-band from said first antenna and convert said digital satellite radio signals into first IF signals;
a second processing circuit located within said receiver housing and coupled to a connector mechanism, said second processing circuit being configured to receive digital satellite radio signals in a satellite-band via said connector mechanism and convert the digital satellite radio signals into second IF signals;
decoder circuitry for extracting at least one of audio and data;
diversity signal processing circuitry coupled to the decoder circuitry and to said first processing circuit and said second processing circuit, wherein said diversity signal processing circuitry receives the first and second IF signals from said first and second processing circuits, selects at least one of the first and second IF signals for processing, and provides the selected IF signals to the decoder circuitry for processing to extract at least one of audio and data; and a user switch configured to control power consumption of each of said first and second processing circuits based on the state of said switch, said switch having at least three states, wherein the power consumption of said first processing circuit is reduced relative to the power consumption of said second processing circuit in a first state of said switch, the power consumption of said second processing circuit is reduced relative to the power consumption of said first processing circuit in a second state of said switch, and the power of said first and second processing circuits is not reduced in a third state of said switch.

23. The receiver of claim 22, further comprising a second antenna located external to said receiver housing and removably coupled to said connector mechanism, wherein said second antenna is configured to receive digital satellite radio signals in an industrial, scientific and medical (ISM) frequency band, convert the digital satellite radio signals in the ISM frequency band into a satellite-band, and provide the digital satellite radio signals in a satellite-band to said second processing circuit via the connector mechanism.

24. The receiver of claim 22, further comprising a second antenna located external to said receiver housing and removably coupled to said connector mechanism, wherein said second antenna is configured to receive digital satellite radio signals in a satellite-band and provide the digital satellite radio signals in the satellite-band to said second processing circuit via the connector mechanism.

* * * * *